Figure 1:
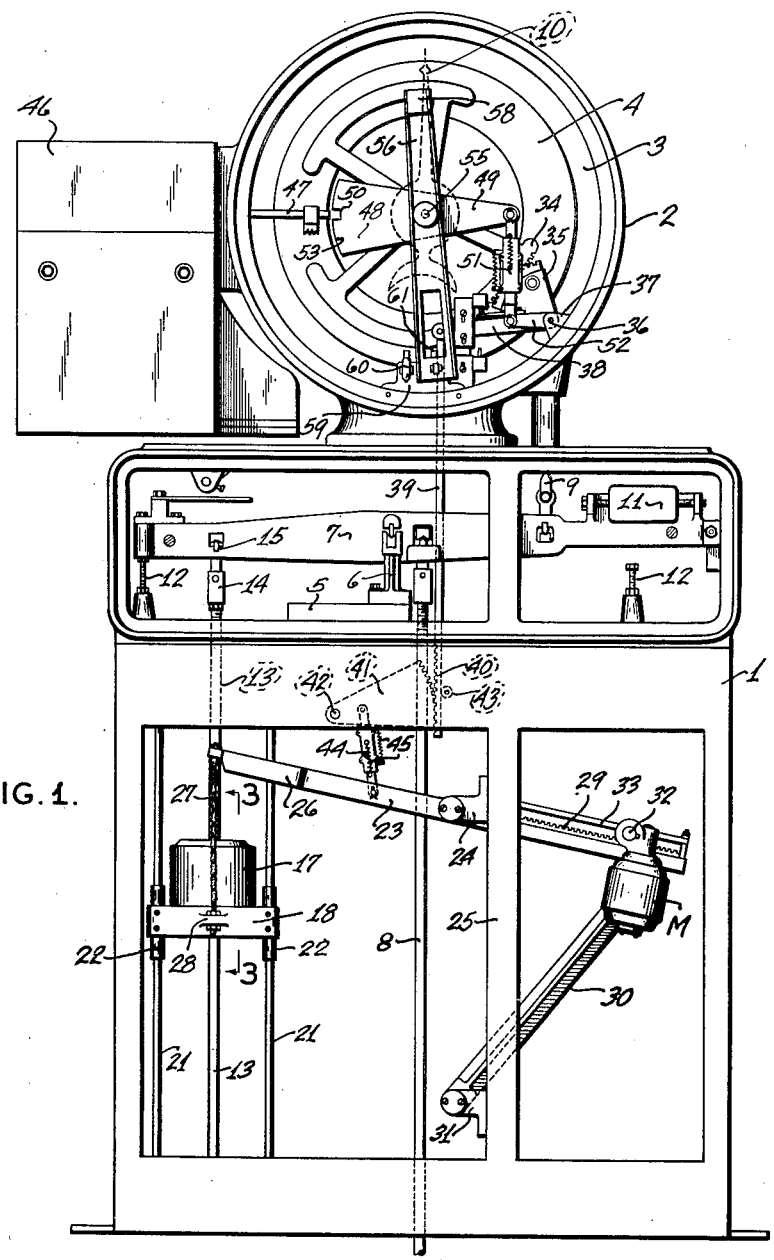

July 28, 1942. W. A. DIMICK ET AL 2,291,150
WEIGHING SCALE
Filed July 27, 1940 2 Sheets-Sheet 1

WILLIAM A. DIMICK INVENTORS
GULDBRAND GULDBRANDSEN
BY
ATTORNEY.

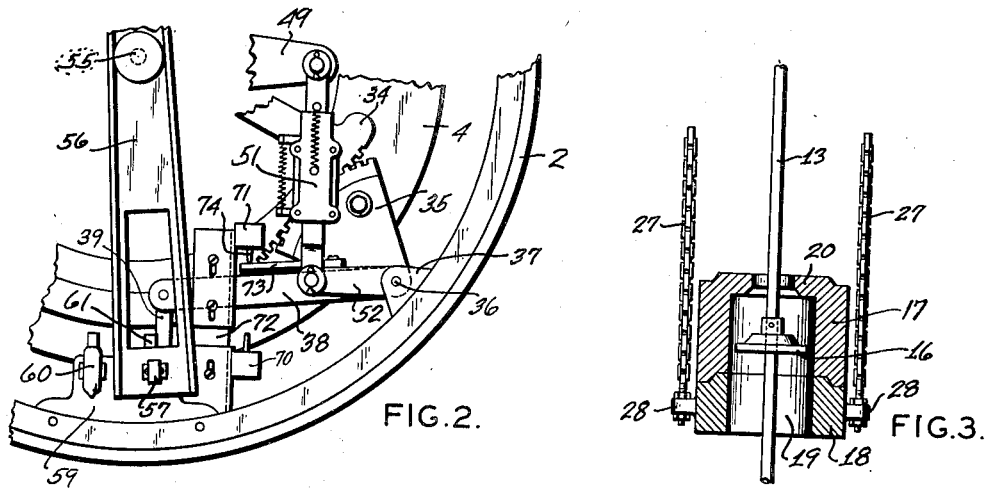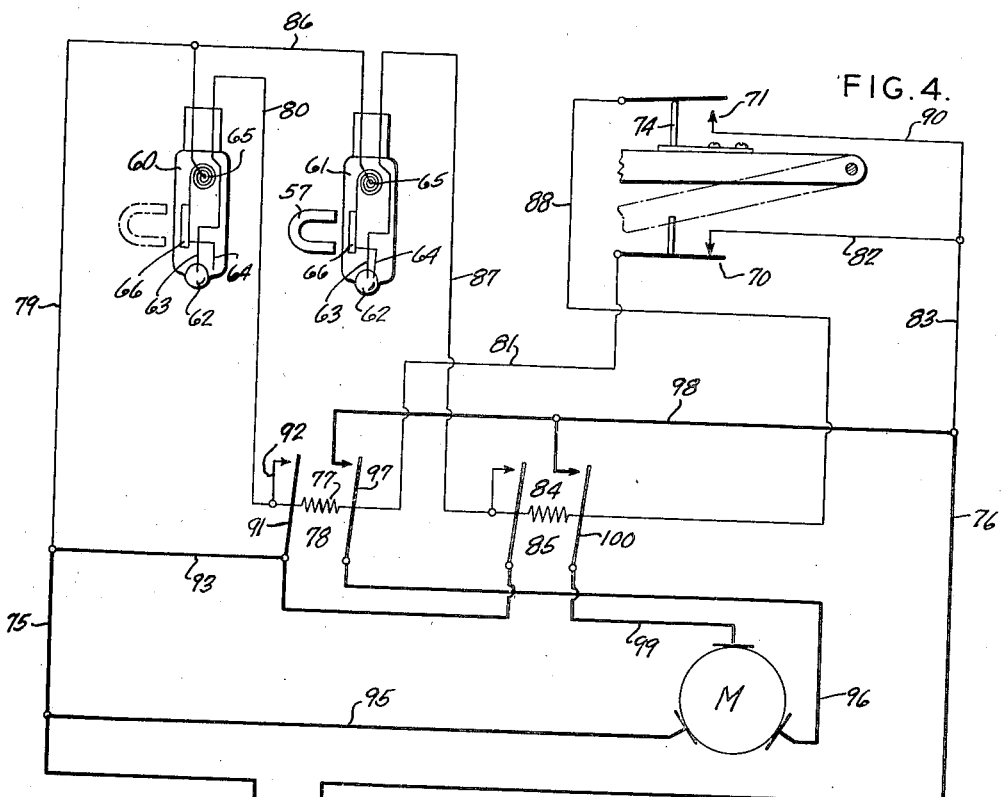

Patented July 28, 1942

2,291,150

UNITED STATES PATENT OFFICE 2,291,150

WEIGHING SCALE

William A. Dimick and Guldbrand Guldbrandsen, St. Johnsbury, Vt., assignors to Fairbanks, Morse & Co., Chicago, Ill., a corporation of Illinois Application July 27, 1940, Serial No. 347,882

2 Claims. (Cl. 265—48)

This invention relates to weighing scales and more particularly to improvements in means for changing the load counterbalancing components of the weighing mechanism of a dial scale and for effecting appropriate changes in its dial chart, whereby to adapt the scale to loads which are in excess of its normally indicated chart capacity.

Scales equipped with means of this character are shown and described in U. S. Letters Patent No. 1,882,456, granted to Morton H. Starr, October 11, 1932, and No. 2,014,275 granted to Alfred Bousfield, September 10, 1935. The means described and illustrated herein for accomplishing the purpose aforesaid are similar in general nature to the means employed in patents referred to above. Thus, an auxiliary counterpoise of predetermined weight value, which normally is operatively disassociated from the weighing mechanism, is placed by mechanical means on the weigh beam to increase the counterbalancing force thereon, such means also functioning to modify the dial indicia in accordance with the changes made in the weighing mechanism. However, whereas heretofore the means provided for increasing the capacity of the scale were manually actuated and controlled, the means of the present invention, in fulfillment of the principal object of the present invention, are operated by an electric motor under fully automatic control.

When a load which is greater than the normal indicated scale capacity is placed on the weighing platform the means of our invention function automatically, in response to the abnormal loads, to change the so-called scale constants to enable the weighing mechanism to determine and indicate properly the weight of the abnormal load.

These and other improvements and advantages will be hereinafter described. In the drawings, Fig. 1 is a rear elevational view of a dial scale with the back plates removed, showing the means of our invention mounted in the scale housings; Fig. 2 is an enlarged fragmentary view of mechanism mounted in the dial head; Fig. 3 is a fragmentary sectional view showing the auxiliary poise and its carriage, the section being taken at line 3—3 of Fig. 1, and Fig. 4 is a wiring diagram showing the control circuit for the motor.

Referring now by characters of reference to the drawings, 1 designates the scale frame generally, and 2 the circular dial frame. Mounted on and within the dial frame 2 is the main dial chart 3 which is fixedly positioned, and an auxiliary dial chart 4 mounted coaxially with and behind the main chart 3. Indicia (not shown) on the auxiliary chart 4 is normally concealed by the main chart when the scale is being used to weigh loads which do not exceed the normal scale capacity, or the maximum load value exhibited on the main dial chart. However, when greater loads are desired to be weighed, necessitating an increase of the counterbalancing forces on the weigh beam by the use of an auxiliary beam poise, the auxiliary chart 4 is caused to be rotated to a position wherein its indicia registers with windows formed in the main dial chart. In this manner the visible indicia is made to correspond to the capacity of the scale as increased beyond its normal value. Provisions for changing the visible dial chart indicia by the use of a fixed main, and a rotatable auxiliary chart as above outlined are shown and fully described in U. S. Letters Patent No. 1,882,456 above referred to, hence further description herein is believed to be unnecessary.

Mounted on a shelf 5 is a beam supporting bracket 6 on which is fulcrumed a weighing beam 7 connected by a draft rod 8 to a suitable lever system supporting a platform (not shown). Pivotal displacement of beam 7 responsive to a load on the scale platform is translated through rod 9 and other suitable means (not shown) to the dial pointer 10. Beam 7 is further provided with the usual adjustable balance ball 11, and adjustable stops 12 which serve to limit the extent of beam oscillation.

Describing now the improved means of the invention for increasing the scale capacity, beam 7 is provided near its so-called butt end with a rod 13 which is pivotally suspended from the beam by means of a clevis and bearing assembly indicated respectively at 14 and 15. Secured to rod 13 at a suitable distance below beam 7 is a disc 16 (Fig. 3) which, as will be understood, rises and falls in accordance with movements of the beam. Rod 13 extends through the central opening in an annular weight 17 that constitutes an auxiliary poise or drop weight and which, when supported by rod 13, is adapted to increase the scale capacity by an amount equal to the maximum capacity as indicated by the main or fixed dial chart. Normally, poise 17 is not supported by rod 13 but instead is supported by a carriage 18 in an elevated position out of contact with disc 16. When elevated by carriage 18 upwardly beyond the range of movement of disc 16, poise 17 becomes operatively disassociated from the scale mechanism. Under such conditions disc 16 is adapted to move in the space 19 formed by aligned passages in the poise and carriage. However, when carriage 18 is lowered by means hereinafter described, a flange portion 20 of the poise seats on the disc 16 and the poise weight becomes transferred from the carriage to the beam rod 13.

Carriage 18 is constrained for vertical movement by means of two vertical guide rods 21 fixed to the scale frame, the carriage having diametrically opposed bearing sleeves 22 arranged to slide on the said guide rods. The carriage 18 is adapted to be raised and lowered by means of a lever 23 mounted on a bearing bracket 24 secured to a member 25 of the scale frame. At its forward end lever 23 is bifurcated to provide laterally spaced arms 26 which are connected by suitable chains 27 to lugs 28 formed on and projecting from opposite sides of the carriage. A rack member 29 extends along and is secured to lever 23 on the opposite side of its fulcrum. Means for actuating lever 23 to raise and lower the poise carriage are provided in a motor M which is adapted to travel back and forth along the rack member 29. Motor M is pivotally attached to the upper end of a rockable arm 30 whose lower end is journalled in a bearing bracket 31 secured to the frame member 25. Motor M drives a pinion shaft 32 to which is fixed a pinion gear (not shown) and such gear meshes with the teeth of rack member 29 and when rotated by the motor travels along the rack. A guide rod 33 on the lever 23 serves to maintain the motor pinion in operative engagement with the rack teeth. It will be understood that when the motor pinion is rotated in a direction to cause the rocker arm 30 to swing to the left (Fig. 1), carriage 18 will be lowered and the poise 17 transferred therefrom onto the beam rod 13 as previously explained. Conversely, when crank arm 30 is returned to its initial, shown position, poise 17 will be lifted from disc 16 and operatively disassociated from the beam 7. It will be understood that the means described herein for effecting motor actuation of the poise carrier, while of a character presently preferred, are merely illustrative and may be substituted by any other appropriate means.

Describing now the means for causing the auxiliary dial chart to be rotated to effect a modification of the visible dial indicia when weighing capacity of the scale is increased as above described, secured to the auxiliary dial 4 is a rack bar 34 the teeth of which mesh with the teeth of a gear sector 35 fixed to a shaft 36 which is journalled on bearing lugs 37 projecting inwardly from the frame 2 of the dial head. Shaft 36 is adapted to be rocked, to effect limited rotation of the auxiliary dial chart, by means of a crank arm 38. Pivotally attached to and depending from the free end of said crank arm is a connecting rod 39 having gear teeth 40 formed on a portion near its lower end. The gear teeth are held in mesh with the teeth of a gear sector 41 pivotally mounted at 42 on the scale frame by a backing roller 43. A link member 44 interconnects the gear sector 41 and the motor actuated lever 23. The connecting link 44 is preferably of extensible-collapsible type having springs 45 which tend to maintain the link in a normal condition of predetermined length. Yieldable safety links of this character are well known in the art, and such a link is advantageously employed in the instant mechanism to permit of lost motion between driving and driven sections of the mechanism and thereby prevent damage in the event that an unintended blocking of the driven parts occurs.

From the foregoing it will appear that the auxiliary dial chart is adapted to be rotated into and out of operative position responsive to movement of lever 23, the movement being transmitted through safety link 44, gear sector 41, connecting rod 39, crank arm 38, shaft 36, gear sector 35 and rack 34.

Where the described capacity increasing mechanism is employed on a scale equipped with means for producing a printed record of weight values, provisions for modifying the recorder mechanism when an abnormal load is weighed are necessary so that the printed record will correspond to the indicated weight value as set forth on the modified dial chart. In Fig. 1 a housing containing recording mechanism is designated 46. Included as a part of the recording mechanism is a so-called sensing finger 47 comprising an endwise reciprocable slide bar. Such bar coacts with the sector-shaped end 48 of a member 49 which is pivotally mounted on the dial frame to rock about an axis coincident with the axis of the dial pointer 10. The arcuate end surface of the sector arm 48 has a recess or notch 50 which is adapted to receive the outer end of sensing finger 47. Under normal operating conditions the sector arm 48 is held in a position, by means to be hereinafter described, such that its notch 50 is in alignment with sensing finger 47. The sector member 49 is connected by a safety link 51 (similar to the safety link 44 previously referred to) to a crank arm 52 extending from the shaft 36. It will now appear that rotation of shaft 36 to effect a modification of the dial chart indicia, as heretofore described, also operates through crank arm 52 and link 51 to rock sector arm 48 to a position wherein notch 50 is out of registration with sensing finger 47. Sensing finger 47 constitutes a control for means (not shown) that operates to modify and adapt the recording mechanism properly to record abnormal load values. The sensing finger 47 initially is held in a retracted position spaced from the end of the sector arm 48. When the recorder is operated, sensing finger 47 is first caused to move outwardly until its movement is checked either by engagement with the bottom of notch 50 or with the outer edge 53 of the sector arm 48.

If an abnormal load is being weighed the extent of movement of the sensing finger will thus be relatively restricted, effecting an adjustment of the recorder mechanism such that the recorded weight is increased by a value equal to the effective value of drop weight 17. When a load within the normal weighing range is being weighed, notch 50 permits the sensing finger to move to its normal position so that no change in the recording mechanism is effected.

Recording mechanism of a type adapted for use in connection with the means of the present invention is illustrated and described in U. S. Letters Patent No. 2,070,011 to Harlan A. Hadley, et al., February 9, 1937.

Describing now the means provided for obtaining automatic control of motor M to increase the capacity of the scale as above described, fixedly secured to the indicator shaft 55 so as to turn with the indicator or pointer 10 is a balanced arm 56 having a permanent magnet 57 secured to one end thereof and a balancing weight 58 secured to its opposite end. Mounted in laterally spaced relation on a bracket 59 secured to the dial frame 2 are magnetically actuated switches 60 and 61. Switches of the type illustrated are available in the trade and consist of a glass envelope containing a globule 62 of mercury into which extends a fixed terminal 63. A movable terminal 64 normally is held by a spring 65 out of contact with the mercury, and carries magnet armature bar 66 of magnetic metal which is adapted to be attracted by an external magnet, in the present case the magnet 57, toward and into the mercury to complete a circuit between it and the fixed terminal 63. Thus the rotatable-magnet arm 56 constitutes the actuating member for switches 60 and 61, and, as will be understood, such arm is operatively connected to the weigh beam through the same instrumentalities that connect the dial pointer to the weigh beam.

As will appear from Fig. 1, the location of switch 61 is such that its armature bar 66 is confronted by the magnet 57 when the latter is in a position corresponding to the zero point on the weight indicator dial. Hence when there is no load on the scale platform switch 61 is held in "closed" condition by magnet 57 as shown in Fig. 4. Switch 60 occupies a position such that when the dial pointer 10 is moved to a limit position beyond the opposite end of the dial scale, said switch will be actuated to closed position by magnet 57. With reference to Fig. 1 the pointer 10 and magnet carrier 56 turn in a counterclockwise direction from their respective zero points to their maximum dial points, which will be approximately 340° of rotation.

As will be hereinafter more fully explained, magnetic switches 60 and 61 serve to initiate operation of motor M. A second set of switches 70 and 71 in circuit relation with switches 60 and 61 respectively, function to terminate operation of motor M and for convenience will be referred to as limit switches. Limit switches 70 and 71 are mounted for vertical adjustment on a bracket 72 below and above, respectively, the crank arm 38. This crank arm carries a striker plate 73 arranged to engage the control plunger 74 of switch 71 and to hold such switch in open condition when said crank arm is at its upper limit of travel, and to open switch 70 when the crank arm 38 is at its lower limit of travel. These positions of the crank arm 38 correspond respectively to normal and augmented scale capacity conditions.

Referring now to the wiring diagram of Fig. 4, electrical energy for operating the motor M and for energizing its control circuit is obtained from power lines 75 and 76. In the control circuit, magnetic switch 60, the solenoid 77 of a double pole relay 78, and limit switch 70 are connected in series circuit relation across the power lines 75 and 76 by conductors 79, 80, 81, 82 and 83. Similarly, magnetic switch 61, the solenoid 84 of a double pole relay 85, and limit switch 71 are connected in series circuit relation across the power lines by conductors 79, 86, 87, 88, 90 and 83. A circuit comprising one pole or movable contact 91 of relay 78, and conductors 92 and 93 provides a by-pass from power line 75 about magnetic switch 60 to relay coil 77. Hence when relay 78 has been closed a subsequent opening of magnetic switch 60 will not operate to interrupt the flow of energy through coil 77 which will remain energized to hold its relay in closed condition until the circuit is interrupted by the opening of limit switch 70. Similar provisions are made to by-pass magnetic switch 61 to maintain coil 84 of relay 85 energized until its circuit is broken by the opening of limit switch 71.

With regard to the power circuit for motor M, which motor is shown to be of three-wire reversible type, the motor is caused to be rotated in one direction when relay 78 is closed, the circuit including conductors 95 and 96, contactor 97 of relay 78, and conductor 98. When relay 85 is closed and relay 78 open, motor M operates in the reverse direction, being energized through a circuit comprising conductors 95 and 99, contactor 100 of relay 85 and conductor 98.

For purposes of description let it be assumed that the main dial chart 3 is marked to indicate weight values of from 0 to 1000 pounds, and that the auxiliary chart 4 is adapted to effect a modification of the main chart and change the indicated weighing range to 1000 to 2000 pounds. The arrangement of dial markings to accomplish this result will be understood by referring to U. S. Patent No. 1,882,456 previously mentioned. Now, starting with the scale mechanism in its normal condition as illustrated in the drawings, if a load of, say, 1500 pounds is placed on the scale platform, the indicator shaft 55 will turn, moving the pointer 10 to a limit position in the unmarked dial space beyond the 1000 pound mark, and the magnet 57 will come into registration with magnetic switch 60. Thereupon magnetic switch 60 will close to complete the circuit through relay solenoid 77 and limit switch 70. This results in the closing of relay 78 and the starting of the motor M in a direction to cause the carrier 18 to descend and transfer the drop weight to the scale beam. Concurrently, the said motor operation changes the dial to the 1000 to 2000 pound scale as previously explained. With the added drop-weight on the beam, pointer 10 will move back to the 1500 pound mark of the modified dial, thus indicating the correct weight of the load. Motor operation is stopped by the opening of limit switch 70 which deenergizes solenoid 77, opening relay 78 and thus breaking the circuit to the motor. As long as the said load remains on the scale platform both of the magnetic switches 60 and 61 will be in open condition for the magnet 57 will be out of influencing relation therewith.

When the load is removed from the scale platform magnet 57 will be returned to its zero load position adjacent to magnetic switch 61, causing the latter to close and complete a circuit through relay coil 84 and limit switch 71 which will be closed whenever the scale mechanism is in capacity augmented condition. This effects a closing of relay 85 and energization of the motor in a direction to restore the weighing mechanism, dial, and motor control mechanism to its initial, normal condition.

It will thus appear that our invention provides for full automatic control of the capacity augmenting agencies of the scale in that the weight of the load on the scale platform is the factor that determines whether the scale mechanism will operate under normal or augmented capacity conditions.

While we have shown a preferred embodiment of our invention it is evident that changes and modifications in the construction herein shown and described may be made that would come within the scope thereof and it is not intended, therefore, to limit the invention to the precise details of construction shown.

What we claim and desire to secure by Letters Patent is:

1. In a scale including a frame and a weigh beam fulcrumed thereon, apparatus for increasing the weighing capacity of the scale, including an auxiliary counterweight, a vertically movable carriage for said counterweight, a lever pivoted to the frame and adapted to raise and lower said carriage, whereby to transfer said counterweight from and to the weigh beam, and means for actuating said lever, comprising a rack member extending along said lever, a rocker arm pivoted to the frame portion, a pinion on said rocker arm, coacting with said rack member, and a motor mounted on said rocker arm connected in driving relation with said pinion.

2. In a dial scale including a frame and a weigh beam fulcrumed thereon, apparatus for increasing the weighing capaicty of the scale, including an auxiliary counterweight, a lever pivoted to the frame and adapted to lower and raise said counterweight to transfer the same to and from the weigh beam, and means for actuating said lever, comprising a rocker arm pivoted at one end to the frame and having its opposite end constrained for movement along said lever, a reversible electric motor mounted on said rocker arm adjacent said lever, and means operatively connecting said motor to said lever whereby said motor, when energized, travels along said lever and causes the same to pivot about its axis.

WILLIAM A. DIMICK.
GULDBRAND GULDBRANDSEN.